United States Patent [19]

Maillefer

[11] Patent Number: 4,569,595
[45] Date of Patent: Feb. 11, 1986

[54] SCREW EXTRUDER FOR PLASTICS

[75] Inventor: Charles E. Maillefer, Buchillon, Switzerland

[73] Assignee: Maillefer S.A., Vaud, Switzerland

[21] Appl. No.: 742,141

[22] Filed: Jun. 7, 1985

Related U.S. Application Data

[63] Continuation of Ser. No. 558,586, Dec. 6, 1983, abandoned.

[30] Foreign Application Priority Data

Dec. 21, 1982 [CH] Switzerland ............... 7439/82

[51] Int. Cl.⁴ ............................................. B29B 1/10
[52] U.S. Cl. ................................. 366/88; 366/149
[58] Field of Search ............... 366/76, 77, 79, 88, 366/89, 96, 97, 98, 99, 145, 148, 149, 307, 323; 425/208

[56] References Cited

U.S. PATENT DOCUMENTS

| | | | |
|---|---|---|---|
| 2,449,355 | 9/1948 | Wiley et al. | 18/12 |
| 2,765,491 | 10/1956 | Magerkurth | 18/12 |
| 3,271,819 | 9/1966 | Lacher | 18/12 |
| 3,331,100 | 7/1967 | Gould | 18/12 |
| 3,358,327 | 12/1960 | Maillefer . | |
| 3,850,415 | 11/1974 | Hansen | 366/89 |
| 3,867,079 | 2/1975 | Kim | 366/76 |
| 3,868,093 | 2/1975 | Sokolow | 366/76 |
| 4,154,535 | 5/1979 | Maillefer . | |
| 4,249,877 | 2/1981 | Machen | 366/76 |
| 4,279,515 | 7/1981 | Effenberger | 366/76 |
| 4,330,214 | 5/1982 | Willert | 366/79 |
| 4,341,474 | 7/1982 | Wheeler | 366/88 |

FOREIGN PATENT DOCUMENTS

| | | | |
|---|---|---|---|
| 733861 | 5/1966 | Canada | 366/76 |
| 551853 | 7/1974 | Switzerland . | |

Primary Examiner—Philip R. Coe
Assistant Examiner—Frankie L. Stinson
Attorney, Agent, or Firm—Parkhurst & Oliff

[57] ABSTRACT

The cylinder of the extruder comprises two parts separated by a heat-insulating gasket. In the wall of the upstream part there are ducts through which a cooling fluid flows. The inside surface of the upstream part is provided with parallel longitudinal grooves or spiralling grooves. The screw is divided into two zones, viz., a feed zone and a plasticizing zone which starts just after the heat-insulating gasket. The plasticizing zone includes an entry channel which gradually decreases in depth downstream and an exit channel which gradually increases in depth downstream. The mass of plastic material leaving the extruder is homogeneous and at a predetermined temperature with high output, as independently as possible of the material used.

10 Claims, 1 Drawing Figure

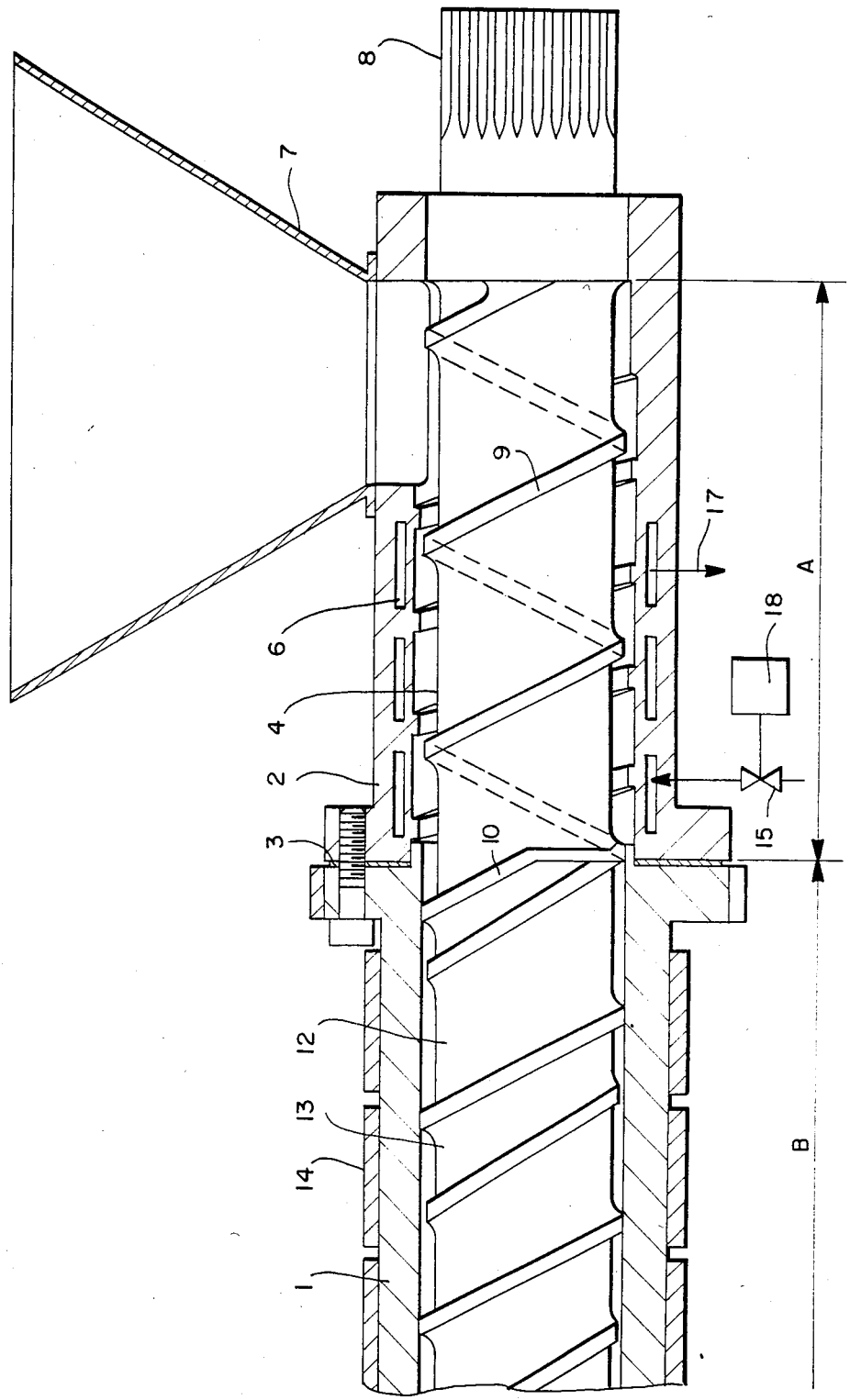

SCREW EXTRUDER FOR PLASTICS

This is a continuation of application Ser. No. 558,586 filed Dec. 6, 1983, now abandoned.

This invention relates to extrusion apparatus, and more particularly to a screw extruder for plastic materials, of the type comprising a screw disposed within a cylinder, rotatingly driven about its axis, and divided along its length into several zones comprising at least a feed zone situated in the upstream portion of the extruder and a plasticizing zone following the feed zone downstream therefrom.

A screw extruder has two functions, viz., a mechanical one consisting in thrusting the material like a pump in order to overcome the resistance of the die, and a thermal one consisting in heating the material uniformly to the softening point suitable for its shaping by the die. Extruders must satisfy not only quality requirements, which means that the plastic material must be homogeneous upon reaching the extrusion head, but also the customary economic requirements; for an extruder must be capable of forcing along the material it treats at the highest possible rate of output. In order to increase this output, the speed of rotation of the screw is increased. At a certain speed of screw rotation, the plastic material becomes too hot to keep its shape upon leaving the die, or it even becomes damaged due to overheating, i.e., the thermal limit is reached.

Those skilled in the art of extruders therefore find themselves confronted with the problem of how to reconcile an increase in output with the requirement for a homogeneous shaped product which does not exceed a certain temperature.

The prior art includes various solutions intended to perform these functions.

It has been proposed to provide a screw divided along its length into two zones. Thus, Swiss Patent No. 612,375 describes an extruder having a screw divided along its length into a feed zone situated at the upstream end of the extruder and an adjacent plasticizing zone downstream from the feed zone. In the feed zone, the screw includes thermal means acting upon the plastic material situated in that zone to limit the rise in temperature.

It has also been proposed to provide grooves in the part of the cylinder corresponding to the feed zone. Thus, Swiss Patent No. 551,853 describes an extruder in which the inside surface of the cylinder is designed in this manner.

It is the object of the present invention to provide an improved extruder having better performance characteristics, regardless of the material to be treated.

To this end, in the plastics extruder according to this invention, of the type initially mentioned, the improvement comprises a cylinder made up of two metal parts separated from one another along the axis of the screw by a thermal barrier situated at the limit between the feed zone and the plasticizing zone of the screw, the upstream part of the cylinder, corresponding to the feed zone of the screw, including cooling means.

In other words, provision is made to divide the extruder, and particularly its screw, into two separate zones, one of which is intended to push the powder or pellets along while keeping them cold as long as possible in order to ensure the forced flow of material. The upstream part of the cylinder is therefore cooled to a low temperature through circulation of a cold fluid, such as water.

With a view to promoting the downstream thrust, the inside surface of the cylinder in the feed zone is preferably provided with either parallel longitudinal grooves or grooves spiralling in the opposite direction from those of the screw.

A preferred embodiment of the invention will now be described in detail with reference to the accompanying drawing, which is a partial longitudinal section through the extruder.

The drawing presents a general view of a screw extruder having certain elements in common with conventional extruders. A cylinder 1 comprises at its upstream end an opening above which a hopper 7 is fixed. The cylindrical portion of cylinder 1 continues upstream from hopper 7 into an end part comprising a bearing for a screw 4 and gasket means. These conventional components are not shown.

Screw 4, having a cylindrical shank, comprises at its upstream end a zone provided with coupling grooves 8 by means of which it can be connected to a drive motor.

The design of cylinder 1 will now be described in detail. Cylinder 1 is made up of two metal parts separated by a thermal barrier in the form of a heat-insulating gasket 3. The upstream part has parallel longitudinal grooves 5 in its inside surface. This part further includes ducts 6 in the thickness of its wall for the circulation of a cooling fluid within cylinder 1 all along its upstream part. Gasket 3 is interposed between the clamping flanges of the upstream and downstream parts of cylinder 1. A thermal barrier with cooling means might be provided instead, or isothermal elements preventing any transfer of heat from one part to the other.

Screw 4 is divided along its length into a feed zone A and a plasticizing zone B. In feed zone A, which extends in length up to thermal barrier 9, screw 4 comprises a spiral thread 9.

Plasticizing zone B of screw 4 starts just after thermal barrier 3. Zone B comprises two threads 10 and 11, the latter being a continuation of thread 9. Threads 10 and 11, together with the shank of screw 4 and with cylinder 1, bound an entry channel 12 and an exit channel 13. Channel 12 decreases in cross-section toward downstream, while the cross-section of channel 13 increases in that direction in order to evacuate the viscous or liquid material as it is formed. In this embodiment of the invention, entry channel 12 gradually decreases in depth toward downstream, whereas exit channel 13 gradually becomes deeper in that direction. The top face of thread 11 is contained in a cylindrical surface coaxial with screw 4, the diameter of which is less than the inside diameter of cylinder 1.

Turning again to the construction of the extruder as a whole, the various functions of the above-mentioned elements will now be described.

The function of feed zone A is to introduce and push along in cylinder 1 the plastic material in the form of pellets or powder contained in hopper 7. Grooves 5 on the inside surface of cylinder 1, extending from hopper 7 to thermal barrier 3, contribute toward putting the pellets under pressure and forcing them downstream; for if the pelletized plastic material rotates in a solid block along with screw 4, it will not move downstream. The purpose of grooves 5 in cylinder 1 is to keep it from thus rotating inasmuch as the plastic material grips into these grooves and must then advance like a nut pushed by the screw. The plastic material must also be kept from melting as this would destroy that grip and consequently prevent the nutlike movement. The degree of cooling in the upstream part of cylinder 1 is regulated in such a way that the plastic powder or pellets are forced downstream against high resistance with only relatively slight heating. Owing to intensive cooling of the upstream part of cylinder 1, the forced flow of material is obtained in the most efficient manner possible.

If longitudinal grooves 5 on the inside surface of cylinder 1 are replaced by grooves spiralling in the opposite direction from the spirals of screw 4, the pelletized plastic material will likewise advance because its rotation will also carry it along downstream.

Plasticizing zone B, starting just after thermal barrier 3, will no longer have the function of increasing the flow pressure but rather of evacuating the plastic material, as soon as it has softened, under the best possible conditions of homogeneity and temperature.

There is thus obtained at the downstream end of screw 4 a mass exhibiting the required conditions for extrusion with a high output, as independently as possible of the material used.

The arrangement described has the great advantage of allowing production of a completely plasticized, homogeneous mass having the required temperature in the exit opening of the extruder for a wide range of operating conditions, by means of the same machine. The flow rate of the cooling fluid in circulation ducts 6, and consequently the degree of cooling exerted in the upstream part of the cylinder, can be continuously regulated. There may be provided for that purpose, e.g., a gate 15 in an inlet conduit 16 of the cooling circuit. A gate may also be provided in an outlet conduit 17. The extent to which this gate or these gates are opened may be varied as a function of certain operating parameters, such as the speed of rotation of screw 4, the type or pellet-size of the plastic material placed in hopper 7. A control or regulating device 18 may act on gate 15 automatically or as a function of a predetermined program.

The foregoing operating procedure thus makes it possible to adapt a given extruder optimally to greatly varying working conditions. The same advantageous possibilities would likewise exist if, for example, a pump were used instead of a gate 15 for causing the cooling fluid to circulate.

The effect of adaptation to varying operating conditions can be obtained only by regulating the degree of cooling in the upstream zone of the cylinder. Only by means of regulation acting in this part of the extruder can the thermal conditions be adapted rapidly enough so that the material placed in the hopper reaches the fluid state exactly at the required location along the extruder.

What is claimed is:

1. A screw extruder for plastic material, comprising a cylinder, a screw disposed within said cylinder and having a shank, and means for rotating said screw about its axis, said extruder being divided along the length thereof into two or more zones including at least a feed zone situated at the upstream end of said extruder and a plasticizing zone following said feed zone downstream therefrom, said plasticizing zone being formed of downstream portions of said cylinder and said screw respectively, said downstream portion of said screw being provided with a shank and two threads beginning at the junction of said upstream and downstream portions, said two threads projecting from said shank and bounding with said cylinder and said shank an entry channel of decreasing cross-section, and an exit channel of increasing cross-section, said feed zone being formed of upstream portions of said cylinder and said screw respectively, said upstream portion of said cylinder having cooling means provided thereon and an upstream portion of said screw having a thread which projects from a cylindrical shank, said plasticizing zone generating heat due to friction for plasticizing said material, said upstream and downstream cylinder portions being different metal parts, a thermal barrier being situated between said upstream and downstream portions at the beginning of said two threads, thereby entirely separating said upstream portion of said screw in said feed zone from said downstream portion in said plasticizing zone so that the upstream portion of the screw feeds solid plastic material while the downstream portion plasticizes the plastic material, said cooling means being positioned in the upstream one of said two metal parts.

2. The extruder of claim 1, wherein said plasticizing zone of said screw includes two threads determining with said shank of said screw and said cylinder an entry channel and an exit channel, the depth of said entry channel decreasing gradually downstream, and the depth of said exit channel increasing gradually downstream.

3. The extruder of claim 1, said plasticizing zone of said screw includes two threads determining with said shank of said screw and said cylinder an entry channel and an exit channel, the width of said entry channel decreasing gradually downstream, and the width of said exit channel increasing gradually downstream.

4. The extruder of claim 1, wherein said cylinder includes parallel longitudinal grooves in the inside surface thereof facing said feed zone of said screw.

5. The extruder of claim 1, wherein said cylinder includes one or more threads bounding spiralling grooves on the inside surface thereof facing said feed zone of said screw, the direction of said one or more threads being opposite to the direction of said two threads of said screw.

6. A screw extruder for plastic material, comprising:
a cylinder having inlet means for feeding plastic material in solid form into said cylinder at an upstream portion thereof and outlet means for expelling said plastic material from said cylinder in a homogeneous plasticized state at a predetermined temperature at a downstream portion thereof;
a screw disposed within said cylinder, said screw having a shank and means for rotating said screw about its axis at a predetermined speed;
said cylinder and said screw defining an upstream feed portion and a downstream portion, said feed portion including cooling means on said upstream portion of said cylinder for maintaining said plastic material in solid form and a first thread arrangement on said shank and said cylinder for feeding solid material toward said downstream portion of said cylinder, said downstream plasticizing portion including said downstream portion of said cylinder and a second thread arrangement projecting from said shank, said second thread arrangement including two threads which bound with said cylinder and said shank in entry channel of decreasing cross-section and an exit channel of increasing cross-section, said downstream plasticizing portion generating heat due to friction for plasticizing said plastic material;

said upstream feed portion and said downstream plasticizing portion being different metal parts; and a thermal barrier located at the junction of said first and second thread arrangement and between said upstream feed portion and said downstream plasticizing portion, said thermal barrier preventing heat generated by friction in said plasticizing zone for transferring to said feed zone and thereby entirely separating the feeding of solid plastic material in said feed zone from the plasticizing of said plastic material in said plasticizing zone.

7. The screw extruder of claim 6, wherein said cooling means includes regulating means for controlling the rate of cooling in the upstream feed portion to maintain said solid plastic material at a predetermined temperature.

8. The screw extruder of claim 7, wherein said regulating means includes responsive means for setting said predetermined temperature in response to operating parameters.

9. The screw extruder of claim 8, wherein said responsive means sets a predetermined temperature in response to speed of rotation of said screw.

10. The screw extruder of claim 8, wherein said responsive means set a predetermined temperature in response to a pellet-size of said solid plastic material.

* * * * *